United States Patent
Li et al.

(10) Patent No.: US 9,020,925 B2
(45) Date of Patent: Apr. 28, 2015

(54) APPLICATION CERTIFICATION AND SEARCH SYSTEM

(71) Applicant: TrustGo Mobile, Inc., Menlo Park, CA (US)

(72) Inventors: Xuyang Li, Dublin, CA (US); Chenfu Bao, Beijing (CN); Shiyong Li, Beijing (CN); Lei Wang, Beijing (CN)

(73) Assignee: TrustGo Mobile, Inc., Menlo Park, CA (US)

( * ) Notice: Subject to any disclaimer, the term of this patent is extended or adjusted under 35 U.S.C. 154(b) by 95 days.

(21) Appl. No.: 13/734,453

(22) Filed: Jan. 4, 2013

(65) Prior Publication Data

US 2014/0019456 A1   Jan. 16, 2014

Related U.S. Application Data

(60) Provisional application No. 61/582,910, filed on Jan. 4, 2012.

(51) Int. Cl.
  *G06F 17/30* (2006.01)
  *G06F 21/57* (2013.01)
  *G06Q 30/02* (2012.01)

(52) U.S. Cl.
  CPC .... *G06F 17/30312* (2013.01); *G06F 17/30522* (2013.01); *G06F 17/30867* (2013.01); *G06F 21/577* (2013.01); *G06Q 30/0282* (2013.01)

(58) Field of Classification Search
  USPC .................................................. 707/706, 741
  See application file for complete search history.

(56) References Cited

U.S. PATENT DOCUMENTS

| | | | |
|---|---|---|---|
| 5,813,009 A * | 9/1998 | Johnson et al. | 707/695 |
| 6,772,139 B1 * | 8/2004 | Smith, III | 707/748 |
| 7,089,552 B2 * | 8/2006 | Atallah | 717/175 |
| 7,287,010 B1 * | 10/2007 | Ishibashi | 705/52 |
| 7,769,712 B2 * | 8/2010 | Waldo et al. | 707/609 |
| 7,963,839 B2 * | 6/2011 | Gatto et al. | 463/16 |
| 7,966,300 B2 * | 6/2011 | Yoshioka | 707/695 |
| 8,037,018 B2 * | 10/2011 | Waldo et al. | 707/609 |
| 8,091,015 B2 * | 1/2012 | Yoshioka et al. | 715/201 |

* cited by examiner

*Primary Examiner* — Kim Nguyen
(74) *Attorney, Agent, or Firm* — Brian N. Young; Fountainhead Law Group P.C.

(57) ABSTRACT

In one embodiment, a method searches a plurality of application marketplaces for applications where each application marketplace includes a plurality of applications available for download to a mobile device. The method then compares a set of applications in different marketplaces to determine certified instances of applications and uncertified instances of applications. Information is stored for the certified instances of the applications that are found in different marketplaces in a database. The method indexes the information for the certified instances of the applications in the database and stores an index based on the indexing. The index is used to provide a search result for a search query for an application.

20 Claims, 7 Drawing Sheets

APPLICATION CERTIFICATION AND SEARCH SYSTEM

CROSS REFERENCE TO RELATED APPLICATIONS

The present disclosure claims priority to U.S. Provisional App. No. 61/582,910, entitled "Secure Application Distribution Platform", filed Jan. 4, 2012, the contents of which is incorporated herein by reference in its entirety.

The present disclosure is related to U.S. patent application Ser. No. 13/734,467, entitled "DETECTING APPLICATION HARMFUL BEHAVIOR AND GRADING APPLICATION RISKS FOR MOBILE DEVICES", and U.S. patent application Ser. No. 13/734,550, entitled "APPLICATION RECOMMENDATION SYSYEM", filed concurrently, the contents of which is incorporated herein by reference in its entirety.

BACKGROUND

As mobile electronic devices, such as smartphones, tablet computers, and smart televisions, are more commonly used, providing security on these devices becomes more important. For example, with the advent of "smart" devices, the mobile electronic devices allow users to download applications from application marketplaces. Some application marketplaces screen the applications that are offered. However, the screening process may not always perform comprehensive tests on the applications for security risks. Further, some application marketplaces are not regulated and allow any companies to place applications in the marketplace for download. This may increase the risk that some of these applications may include security risks because applications are not pre-screened.

Many marketplaces exist that carry many applications. When a user searches for an application, the search engine may return a search result that includes a large amount of applications in different marketplaces. Some of these applications may be legitimate applications, but some may be either malicious or an application that does not function the same way as the real application. However, the user cannot readily tell which applications are the real application the user may desire or which applications are malicious or fake. In some cases, the user may use his/her judgment based on the application description to decide which application to download. However, if the user downloads the wrong application, the application may compromise the security of the mobile electronic device and possibly the data stored by the mobile electronic device. Even worse, the applications may also compromise the security of private enterprise networks if the networks are accessed from a compromised mobile electronic device.

SUMMARY

In one embodiment, a method searches a plurality of application marketplaces for applications where each application marketplace includes a plurality of applications available for download to a mobile device. The method then compares a set of applications in different marketplaces to determine certified instances of applications and uncertified instances of applications. Information is stored for the certified instances of the applications that are found in different marketplaces in a database. The method indexes the information for the certified instances of the applications in the database and stores an index based on the indexing. The index is used to provide a search result for a search query for an application.

In one embodiment, a non-transitory computer-readable storage medium is provided containing instructions, that when executed, control a computer system to be configured for: searching a plurality of application marketplaces for applications, wherein each application marketplace includes a plurality of applications available for download to a mobile device; comparing a set of applications in different marketplaces to determine certified instances of applications and uncertified instances of applications; storing information for the certified instances of the applications that are found in different marketplaces in a database; indexing the information for the certified instances of the applications in the database; and storing an index based on the indexing, wherein the index is used to provide a search result for a search query for an application.

In one embodiment, a method is provided comprising: searching, by a computer system, a plurality of application marketplaces, wherein each application marketplace includes a plurality of applications available for download to a mobile device; determining, by the computer system, a set of applications in different marketplaces as certified instances of applications and uncertified instances of applications; indexing, by the computer system, the certified instances of the applications that are found in different marketplaces; receiving a search query for an application; searching, by the computer system, an index based on the indexing to determine certified instances of applications that are associated with the search query; and returning, by the computer system, a search result for search query that includes at least a portion of the determined certified instances.

The following detailed description and accompanying drawings provide a better understanding of the nature and advantages of particular embodiments.

DETAILED DESCRIPTION

Described herein are techniques for an application certification and search system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a certification and search system for applications offered from application marketplaces. The certification system may analyze applications in various marketplaces and determine certified instances of applications. The analyzing may also identify uncertified copies of the application. Then, when a user searches for applications, the search results returned may include certified instances of applications and possibly not the uncertified instances. This may improve security as users are less likely to download uncertified applications, which may include security risks, malicious code, or be fake copies of applications.

System Overview

Figure 1:
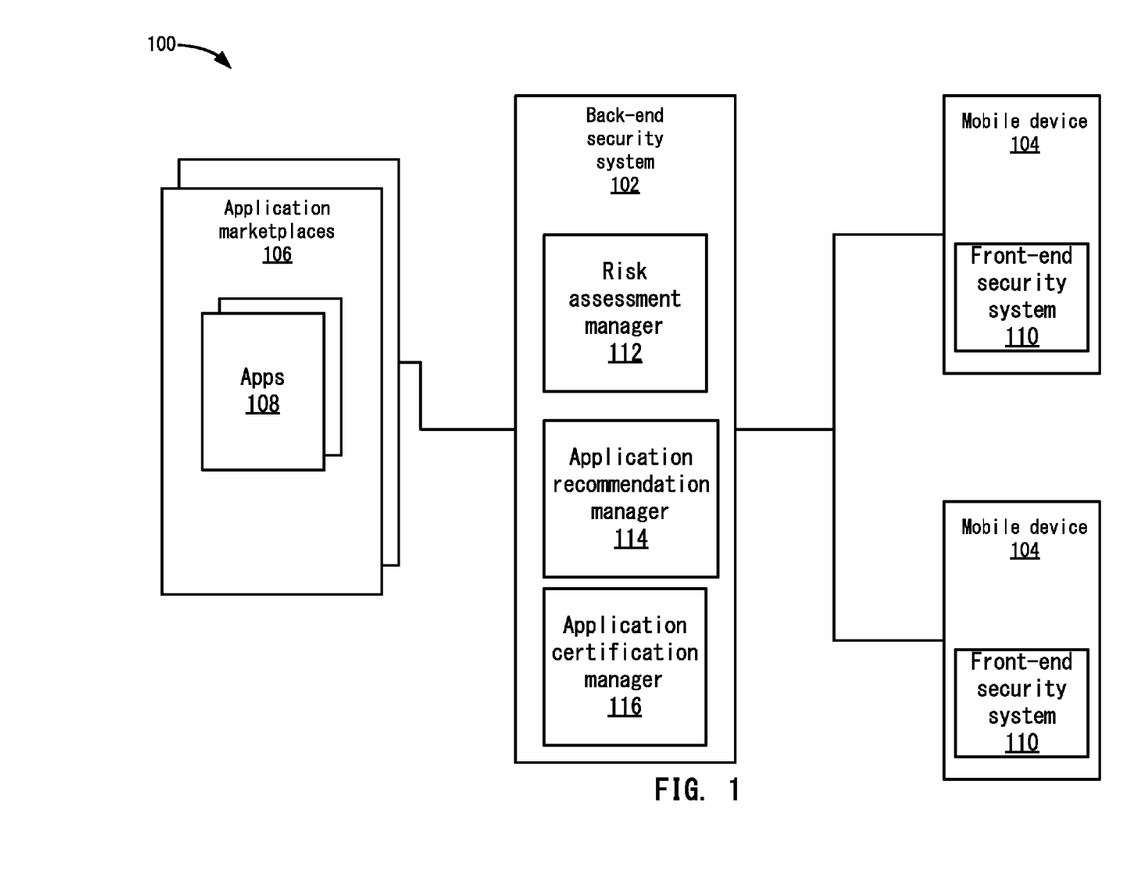
FIG. 1 depicts a simplified system for providing security according to one embodiment.

FIG. 1 depicts a simplified system 100 for providing security according to one embodiment. System 100 includes a back-end security system 102 that may interact with mobile devices 104. In one embodiment, back-end security system 102 provides security services to mobile devices 104, which download applications (apps) 108 from application marketplaces 106.

Mobile devices 104 may be computing devices that can download applications 108, such as smartphones, tablet computers, smart televisions, laptop computers, and personal computers. Mobile devices 104 include a front-end security system 110 that may analyze applications 108 for security risks on mobile device 104. Front-end security system 110 evaluates applications 108 on mobile device 104 according to multiple independent aspects of security. In some examples, front-end security system 110 may interact with back-end security system 102 to send results of analysis of applications 108 on mobile device 104. For example, front-end security system 110 may analyze the use of applications 108, scan mobile device 104 for security risks, and then send information related to the analysis to back-end security system 102.

In one embodiment, back-end security system 102 includes a risk assessment manager 112, an application recommendation manager 114, and an application certification manager 116. Risk assessment manager 112 may assess the risk of applications 108 and provide a security rating based on the assessment. In one embodiment, the security rating may be tailored to how applications 108 are used on mobile devices 104. For example, the security ratings may include certified, malicious, high-risk, and low-risk/noisy ratings. These security ratings will be described in more detail below.

Application recommendation manager 114 may recommend new applications to users. In one embodiment, application recommendation manager 114 may communicate with front-end security system 110 to determine the new application recommendations. For example, application recommendation manager 114 may use user preferences and user behaviors that are determined based on actions performed on mobile device 104 in addition to information from similar users, such as a user's friends in a social network, to determine the application recommendations. In one embodiment, application recommendation manager 114 may provide the application recommendations based on communication with front-end security system 110. In other embodiments, front-end security system 110 may determine the application recommendations without communication with back-end security system 102.

Application certification manager 116 provides certification that an instance of an application 108 in a marketplace 106 is an authentic copy. For example, an instance of an application 108 may be found in multiple application marketplaces 106. However, specific instances of the application may not be certified copies. That is, other application developers (e.g., individuals or companies) may copy an application 108 and/or modify an application 108. Application certification manager 116 scans applications 108 in application marketplaces 106, and can determine whether applications 108 are a certified copy. Thus, when a user wants to download an application 108 from a specific application marketplace 106, the user can review the application certification to determine whether to download the application. Additionally, the application certification may indicate to users, organizations, enterprises, application stores, device providers, networks, and/or any other interested party, that the application has adequate security. The security certification may be unique to each certified application so that users can validate its authenticity.

Application Certification

Particular embodiments evaluate applications 108 in various application marketplaces 106. For example, different application marketplaces 106 may include different applications 108. However, marketplaces 106 may offer the same instance of an application 108. For example, different marketplaces 106 may be offering the same instance of a video game. That is, each marketplace 106 is offering a video game of the title "Game #1". However, some of these instances may be malicious or invalid copies of the correct instance. For example, some application developers may copy the video game and add certain malicious code to the instance. That is, Game #1 is offered by an "Application developer #1". However, a second application developer "Application developer #2" may copy the game and offer Game #1 itself. However, Application developer #2 may add malicious code to its copy of Game #1. Then, Application developer #2 offers its copy of Game #2 in an application marketplace 106 for download. When a user downloads this instance and executes the application, the malicious code in the application may harm the user's mobile device 104.

Particular embodiments search for (e.g., crawl) applications 108 stored in multiple application marketplaces 106 to determine certified instances of an application and uncertified instances of an application. This provides better security as application marketplaces 106 can know which applications are certified in their marketplaces and also users can see which applications have been certified. Additionally, particular embodiments provide a search engine to mobile devices 104 where a user can search for an application. A search query processor can then search the certified applications and return a search result to the user that includes the certified applications or includes both certified and uncertified applications, but with security ratings that may indicate to users that some applications may be uncertified and possibly malicious or harmful. In one embodiment, the search query processor may not return uncertified applications to the user. Thus, security is improved as users are not provided search results that include uncertified applications that may perform malicious behavior if downloaded to mobile devices 104. In other embodiments, the search query processor can provide a search result with uncertified applications, but may mark the uncertified applications as being uncertified so that a user can see which ones are certified and uncertified.

Figure 2:
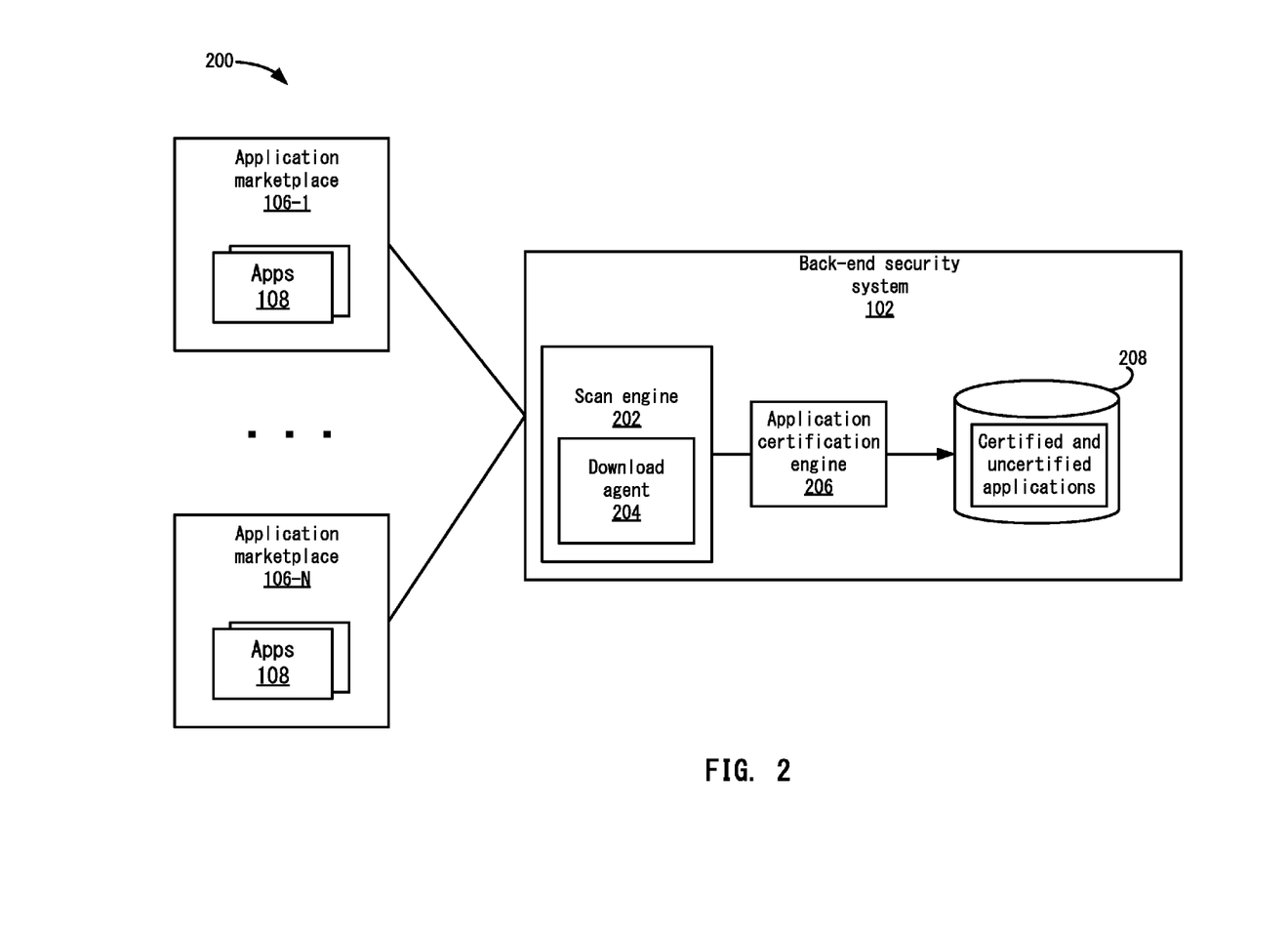
FIG. 2 depicts an example of a system for scanning applications in marketplaces 106 according to one embodiment.

FIG. 2 depicts an example of a system 200 for scanning applications 108 in marketplaces 106 according to one embodiment. Back-end security system 102 includes a scan engine 202 that may crawl marketplaces 106-1-106-N. In crawling, scan engine 202 may retrieve instances of applications 108 from application marketplaces 106. For example, a download agent 204 of scan engine 202 downloads each application 108 from marketplaces 106. The downloading may be performed through an application programming interface (API) or by a program that automatically downloads applications 108. In one embodiment, download agent 204 downloads an application package, such as by installing an application on a device.

In an embodiment, download agent 204 includes 2 layers: a market specific layer, which handles the differences in application stores or markets. For example, different application markets may have different access protocols; different structures and layouts of application data, and include information unique to different application markets, geographic regions, languages, and categories. This helps identify the same application that may have slightly different application data in different marketplaces 106.

Conversely, some application data may not change between different application markets or stores, such as an application name, description, author, price, download count, review score, review users, comments, category, version, operating system, icons, thumbnail, release date, update date. In an embodiment, a market independent layer of download agent 204 identifies and parses this information.

Additionally, download agent 204 may include a scheduler to coordinate the application data retrieval from multiple application stores. For example, download agent 204 may continuously scan marketplaces 106 for changes (e.g., added, deleted, or updated applications 108).

Once applications are downloaded, an application certification engine 206 analyzes applications 108 to certify instances of applications 108. As described above, different instances of the same application may exist in different application marketplaces 106. Application certification engine 206 determines which instances are certified and which instances are uncertified. Certified instances may be instances that are valid or associated with an originating developer (e.g., company) that released the application. A certified instance may also be a clone of the application that does not include malicious software. For example, particular embodiments communicate with the application developer may be performed to receive an original copy of the certified instance. The certified instance is then stored and used in the subsequent analysis. An uncertified instance may be an instance of the application that has not been released by the original developer or an instance that has been altered and includes malicious code.

An instance of an application 108 may be a discrete offering of an application in a specific application marketplace 106. In some cases, the instances in different application marketplaces 106 may be the same exact application. In other cases, different marketplaces 106 may claim to be offering the same application 108, but the instance is an invalid copy or includes malicious code. For example, a Game #1 may have different instances in different marketplaces 106 that are offered by the same developer. Based on application data, application certification engine 206 associates these instances together. For example, application data, such as application certificates, application package name, titles and developer information, is used by application certification engine 206 to associate instances of an application together. The application certificate may be a digital certificate within the application that indicates the actual publisher of the application, the title is the name of the application, and the developer is a company or person that developed or released the application. In one example, for each instance of an application 108, a hash code, for example, MD5, is generated to uniquely identify an app. When two instances on different application marketplaces 106 have the same hash code, they are considered to be the same application. For example, if two applications have different package names, they are different applications. If two applications have same package name, but have different certificates, this means the applications are actually developed by different developers, although claimed to be same application. These two applications may have different hash codes and thus are different applications due to the different certificates.

Application certification engine 206 then stores information for certified applications in a storage 208. Also, uncertified applications may be stored and identified as uncertified. The information may be structured data that describes the certified and uncertified applications. Then, as will be described in more detail below, the information for the certified and uncertified applications 108 may be indexed to allow for a user to search for an application. In this case, uncertified applications 108 may be or may not be indexed with certified applications 108. As discussed above, the uncertified applications may or may not be provided in search results to a user.

Figure 3:
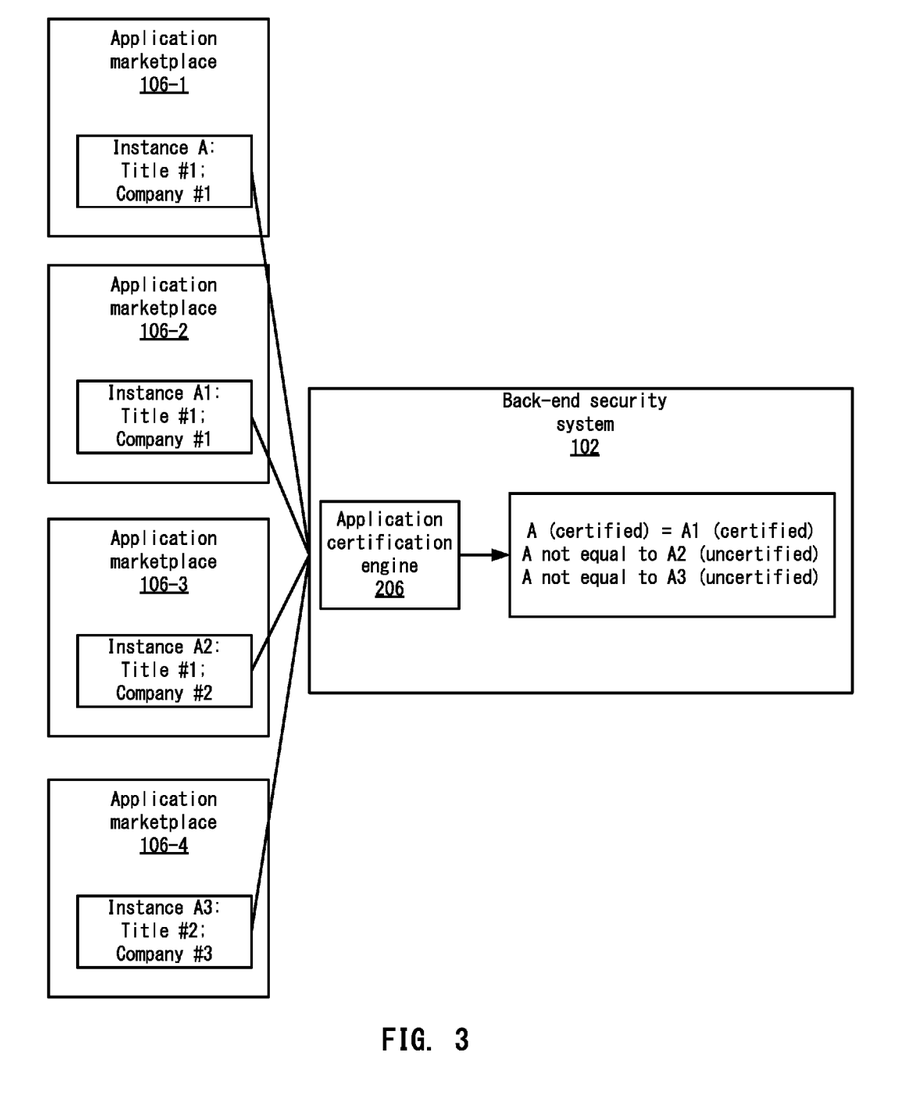
FIG. 3 shows a specific example of an application certification process according to one embodiment.

FIG. 3 shows a specific example of an application certification process according to one embodiment. As shown, four instances A, A1, A2, and A3 of an application are shown in four different marketplaces 106-1-106-4. Download agent 204 downloads these instances to back-end security system 102 from application marketplaces 106-1-106-4.

Application certification engine 206 receives instances A, A1, A2, and A3 of applications 108-1-108-4. Application instance A has a title of "Title #1" and is developed by a "Application developer #1". This may be the certified copy of application 108. That is, this instance has been released by the correct application developer, has the correct title, and has no malicious code. Also, an independent application developer may have certified this instance and a certificate is included in application data in the application package for this instance. Instance A1 includes the title of "Title #1" and is developed by "Application developer #1". This instance may be the exact same instance as instance A, but is offered in a different application marketplace.

Instance A2 may have the title of "Title #1", but is developed by "Application developer #2 that is different from Application developer #1. In this case, Application developer #2 may have copied the same application as instances A and A1, but Instance A2 has a different certificate from the different Application developer. Instance A3 has the title "Title #2" and is developed by an "Application developer #3". In this case, Application developer #3 may have changed the title slightly from Title #1, but is trying to trick users into downloading this copy instead of the certified copy. Instance A3 also includes a certificate for Application developer #3.

In analyzing the above instances, application certification engine 206 determines that instance A equals instance A1. In this case, the same application developers are offering the same application in different marketplaces. However, application certification engine 206 determines that instance A does not equal instance A2 and instance A does not equal instance A3. For example, application certification engine 206 may determine that instance A2 is developed by a different developer or includes malicious code and thus does not equal instance A. Also, application certification engine 206 may determine that instance A3 is developed by another application developer or has a different title. After the analysis, application certification engine 206 thus labels instances A and A1 as certified and instances A2 and A3 as uncertified.

Figure 4:
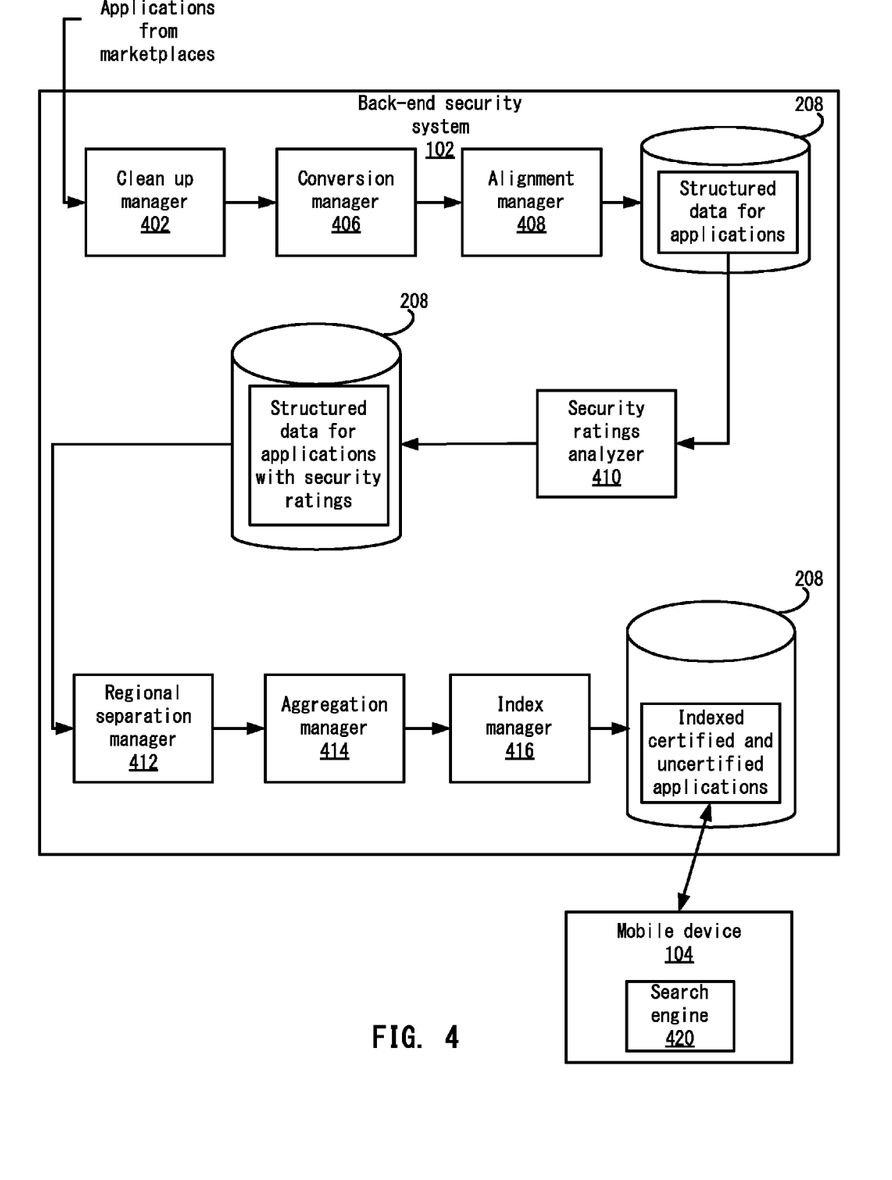
FIG. 4 depicts a more detailed example for certifying applications according to one embodiment.

FIG. 4 depicts a more detailed example for certifying applications 108 according to one embodiment. Application certification engine 206 may include a clean-up manager 402 that performs a clean-up process. Clean-up manager 402 may detect whether an application 108 has become unavailable in an application marketplace 106. For example, some applications 108 may not always be available in a given marketplace 106. Clean-up manager 402 may detect the unavailability and mark this application as uncertified. Thus, this application 108 may not be available for searching.

Additionally, clean-up manager 402 may identify if an instance of application 108 is unique or merely an update to an existing application 108. For example, when application content or information such as the price, description, or version has changed, clean-up manager 402 may determine that an update has been performed. Additionally, in some embodiments, clean-up manager 402 analyzes the uniform resource locator (URL) associated with an instance of application 108 in application marketplace 106 to determine if the URL is consistent across different instances. If the URL is the same, then this instance may be determined to be the same instance as a prior instance. Clean-up manager 402 then may provide the URL, application name, and author to identify the instance.

A conversion manager 406 may convert various application data into a consistent format. For example, a price in local currency, local language, category, and other information may be converted into a consistent format. In one example, currencies may be converted into a single currency, languages may be converted into a single language, and different categories may be converted into a default category. This makes different information from different application marketplaces 106 consistent.

An alignment manager 408 aligns application data for different instances. Different application marketplaces 106 may provide different sets of application data for an instance of application 108. For example, the synopsis of an instance may be different in different application marketplaces 106. Alignment manager 408 performs an alignment process that constructs a unified application data payload. Typical data that is aligned may include application names, author, description, category, price, access link, download link, version, release date, update date, icons, thumbnails, supported operating system, operating system version, history versions, download count, reviews by users, user comments, and review scores. The alignment process is a normalization procedure that makes the comparison of different application instances from different market places possible. Once the instances of applications have been extracted, cleaned, converted, and/or aligned, structured application data that describes the applications is stored in storage 208. The structured application data may be stored in a database format that can be queried.

A security ratings analyzer 410 may then analyze applications 108 in storage 208. In one embodiment, a series of security analyzers will perform various security scans and analyses on the applications to classify applications based on one or more aspects of security, such as risk of malicious behavior; application performance including battery, processor and memory, network data usage; and privacy violations including tracking location, accessing contacts, accessing messages, turning on a camera or taking video. For example, different security ratings may be assigned to applications 108. The application ratings may classify each instance of an application. More details for assigning security ratings to instances of applications 108 are described in U.S. patent application Ser. No. 13/734,467, entitled "Detecting Application Harmful Behavior and Grading Application Risks for Mobile Devices", filed concurrently, the contents of which is incorporated herein by reference in its entirety. Applications 108 may be stored with the security ratings in storage 208.

In addition to the processing the applications for security risks, additional processing may be performed. For example, a regional separation manager 412 may organize applications by regions. This processing is performed because some applications 108 may not be available in certain geographic regions. Additionally, an aggregation manager 414 may aggregate instances of the same application 108 from different application marketplaces 106. For example, instances with consistent or slightly different application names, descriptions, versions, price, category, download count, reviews by users, review scores, access links, may be analyzed and then aggregated into a single entry. In this case, only a single entry for the same instance may be returned in a search result. In one embodiment, aggregation manager 414 may check information to determine if two or more instances of an application 108 are merely different instances of the same application or two different instances. The information may be an application package name, application name, and developer. In another embodiment, if an application is updated in one or more application marketplaces 106, or retired, aggregation manager 414 determines this and maintains a mapping relationship between the updated applications or retired applications. For example, if two instances have a same application package name, they will be aggregated by aggregation manager 414. For an instance not having the application package name information, aggregation manager 414 will compare its application name and developer name against another instance's application name and developer name. If they are same, they will be aggregated.

After aggregation, a structured application data set for an aggregated instance may include an application name, application description, version (e.g., the highest version from instances of applications 108 that are aggregated together), category, security rating (e.g., the lowest security rating may be used if multiple instances of application 108 are rated differently), icons, thumbnails, review comments, and review counts. Additionally, each instance may include application instance-specific data. For example, the application instance-specific data may include an instance application name, specific instance description, associated application marketplace 106 where the specific instance is stored, associated price, version, an access link, and specific security rating.

An index manager 416 may then index both the aggregated application data and instance-specific application data. An index for the data is then stored in storage 208 and made available to a search engine 420. For example, only certified instances of aggregated applications and instance-specific applications may be indexed in storage 208 or both certified and uncertified are stored.

Figure 5:
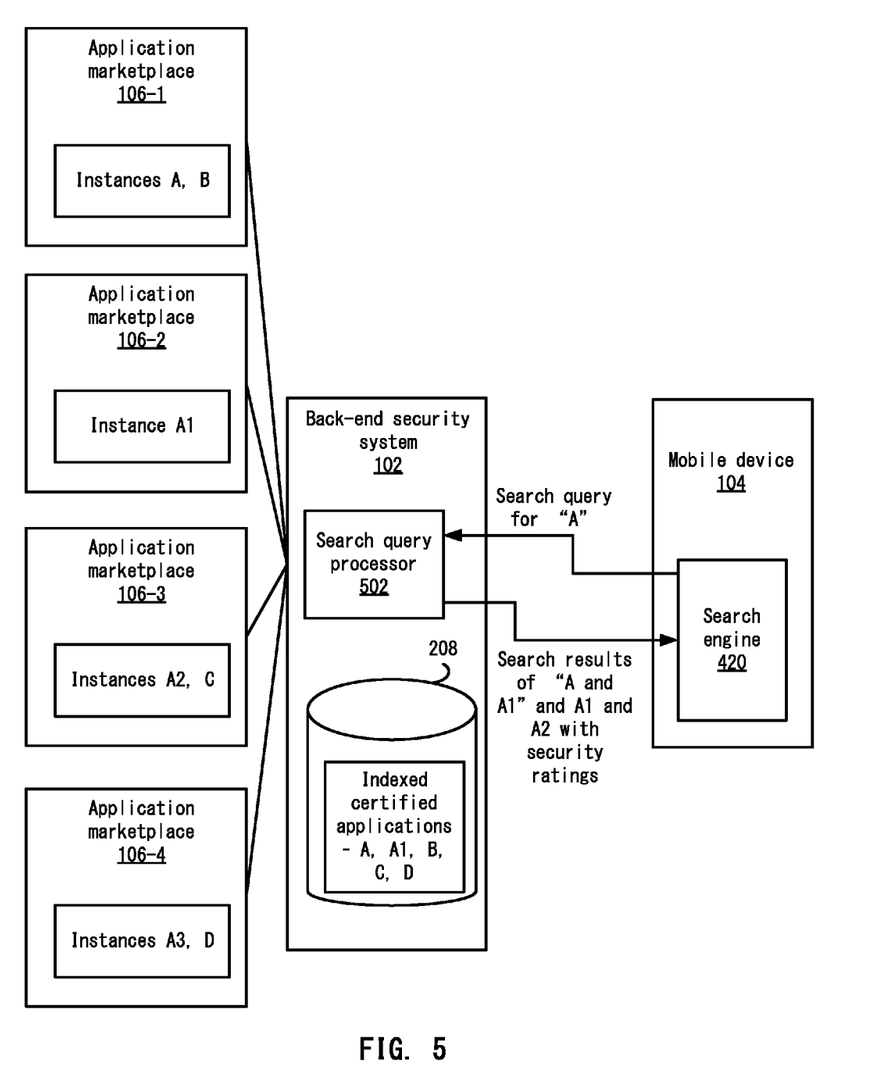
FIG. 5 depicts an example of the search process according to one embodiment.

Once index manager 416 indexes applications 108 in storage 208, particular embodiments can provide search results to users. FIG. 5 depicts an example of the search process according to one embodiment. Back-end security system 102 includes a search query processor 502 and storage 208. Storage 208 may include certified instances of applications 108. For example, instances A and A1 of an application are stored in storage 208. Additionally, storage 208 includes other applications 108, such as instances B, C, and D of different applications and also uncertified applications A2 and A3.

As described above, application certification engine 206 determines various instances of applications 108 that are uncertified in application marketplaces 106. For example, as shown in application marketplaces 106-3 and 106-4, instances A2 and A3 of application 108 are available. Search query processor 502 does not provide search results that include instances A2 and A3, or provide search results that includes instances A2, A3, but with their security ratings marked.

A mobile device 104 may include a search engine 420 that allows a user to perform searches. In a further example, front-end security system 110 may include an application store enabling users to optionally purchase, download, and install applications and content. In an embodiment, the application store may restrict access to applications based on one or more aspects of security. For example, the application store may not allow applications with low security ratings in one or more security aspects to be distributed to users. The application store may be a standalone system or integrated into other front-end systems, such as a search query tool 504 and/or an application recommendation system. In this example, the application store may be provided as part of search query tool 504.

Similarly, another example of front-end security system 110 may include support for one or more third-party application stores. In this example, enterprises, organizations, device manufacturers and vendors, and network providers may present their own application stores to users. A third-party application store may utilize the application store support system to implement the application store functionality using the front-end and/or back-end systems. For example, a company may want to have its own internal application store to provide screened and approved applications to their employees. In this example, the company could utilize the application store support system and the back-end systems to implement their application store.

In one example, a user may search for an application "A". Search query tool 504 may then send the search query to search query processor 502. Using indexed applications in storage 208, search query processor 502 determines applications that match the search query for application "A". In this case, the applications may be instances A and A1. Search query processor 502 returns a search result that includes instances A and A1. Then, a user of mobile device 104 may download instance A or A1 from application marketplaces 106-1 or 106-2, respectively. Thus, a user is not returned a search result that includes uncertified instances A2 and A3 and is not provided the opportunity to download these applications. This protects a user from downloading applications that are not certified and may include malicious code or not be an instance of an application the user is looking for.

Figure 6:
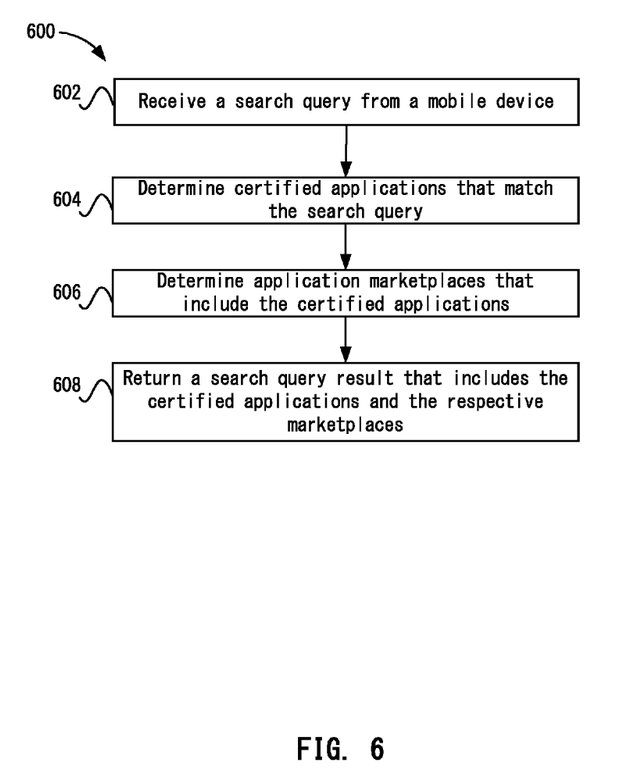
FIG. 6 depicts a simplified flowchart of a method for processing search queries according to one embodiment.

FIG. 6 depicts a simplified flowchart of a method for processing search queries according to one embodiment. At 602, search query processor 502 receives a search query from mobile device 104. The search query may specify keywords (e.g., a title or developer name) for an application.

At 604, search query processor 502 determines certified applications that match the search query. At 606, search query processor 502 determines application marketplaces 106 that include the certified applications. At 608, search query processor 502 returns a search query result that includes the certified applications and the respective marketplaces and possibly uncertified applications. In another example, search query processor 502 returns a search result that includes an aggregated instance of an application. A user may select this instance and then be provided multiple links to each application marketplace 106 that is offering an application 108 that is associated with this aggregated instance.

Accordingly, particular embodiments evaluate applications according to multiple independent aspects of security. This may be used for a variety of purposes, including providing application search engines to users or third-parties, providing application recommendations, protecting user devices from applications that violate one or more security aspects, providing a store for users to download pre-screened certified applications, and enabling application developers to submit applications for certification.

Figure 7:
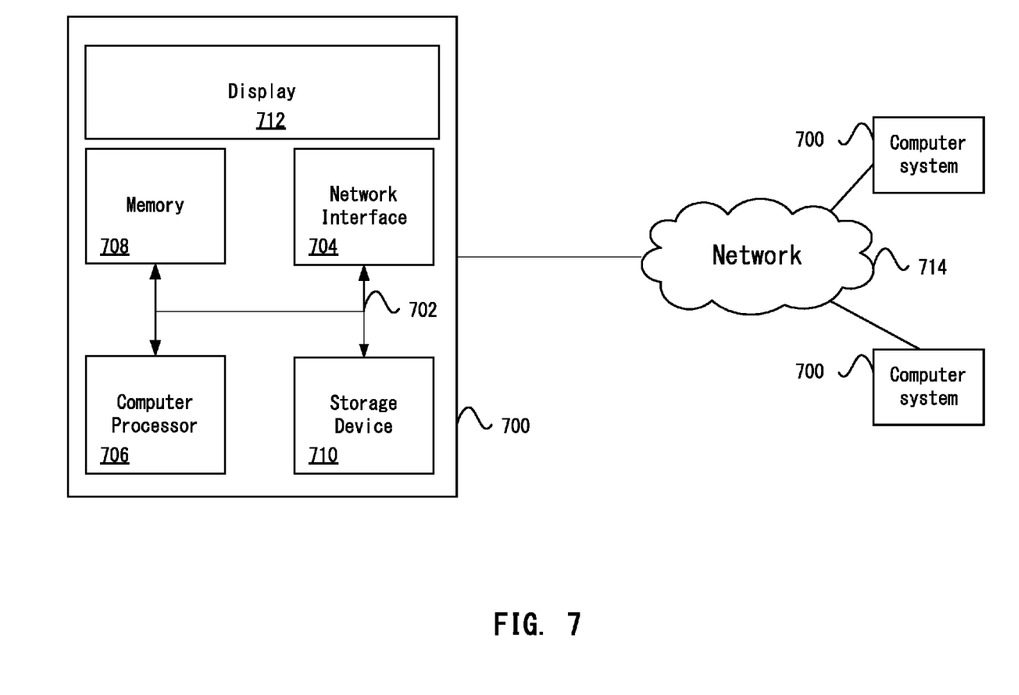
FIG. 7 illustrates an example of a special purpose computer system configured with a certification and search system according to one embodiment.

FIG. 7 illustrates an example of a special purpose computer system 700 configured with a certification and search system according to one embodiment. Computer system 700 includes a bus 702, network interface 704, a computer processor 706, a memory 708, a storage device 710, and a display 712.

Bus 702 may be a communication mechanism for communicating information. Computer processor 704 may execute computer programs stored in memory 708 or storage device 708. Any suitable programming language can be used to implement the routines of particular embodiments including C, C++, Java, assembly language, etc. Different programming techniques can be employed such as procedural or object oriented. The routines can execute on a single computer system 700 or multiple computer systems 700. Further, multiple processors 706 may be used.

Memory 708 may store instructions, such as source code or binary code, for performing the techniques described above. Memory 708 may also be used for storing variables or other intermediate information during execution of instructions to be executed by processor 706. Examples of memory 708 include random access memory (RAM), read only memory (ROM), or both.

Storage device 710 may also store instructions, such as source code or binary code, for performing the techniques described above. Storage device 710 may additionally store data used and manipulated by computer processor 706. For example, storage device 710 may be a database that is accessed by computer system 700. Other examples of storage device 710 include random access memory (RAM), read only memory (ROM), a hard drive, a magnetic disk, an optical disk, a CD-ROM, a DVD, a flash memory, a USB memory card, or any other medium from which a computer can read.

Memory 708 or storage device 710 may be an example of a non-transitory computer-readable storage medium for use by or in connection with computer system 700. The computer-readable storage medium contains instructions for controlling a computer system to be operable to perform functions described by particular embodiments. The instructions, when executed by one or more computer processors, may be operable to perform that which is described in particular embodiments.

Computer system 700 includes a display 712 for displaying information to a computer user. Display 712 may display a user interface used by a user to interact with computer system 700.

Computer system 700 also includes a network interface 704 to provide data communication connection over a network, such as a local area network (LAN) or wide area network (WAN). Wireless networks may also be used. In any such implementation, network interface 704 sends and receives electrical, electromagnetic, or optical signals that carry digital data streams representing various types of information.

Computer system 700 can send and receive information through network interface 704 across a network 714, which may be an Intranet or the Internet. Computer system 700 may interact with other computer systems 700 through network 714. In some examples, client-server communications occur through network 714. Also, implementations of particular embodiments may be distributed across computer systems 700 through network 714.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    searching, by a computer system, a plurality of application marketplaces for applications, wherein each application marketplace includes a plurality of applications available for download to a mobile device;
    analyzing, by the computer system, information from the plurality of application marketplaces to determine which applications are identified as a same application in different application marketplaces;
    identifying, by the computer system, a plurality of instances of the same application in the different application marketplaces;
    comparing, by the computer system, the plurality of instances of the same application in the different application marketplaces to determine certified instances of the same application and uncertified instances of the same application;
    storing, by the computer system, information for the certified instances of the same application that are found in the different application marketplaces in a database;
    indexing, by the computer system, the information for the certified instances of the same application in the database; and
    storing, by the computer system, an index based on the indexing, wherein the index is used to provide a search result for a search query for the same application, wherein the search result includes at least a portion of the certified instances of the same application, and does not include the uncertified instances of the same application or includes information indicating the uncertified instances of the same application are uncertified.

2. The method of claim 1, wherein comparing the plurality of instances of the same application in the different application marketplaces to determine the certified instances of the same application and the uncertified instances of the same application comprises:
    determining a certified instance of the same application;
    determining application data associated with the certified instance of the same application; and
    determining if a second instance of the same application is not certified based on comparing application data associated with the second instance and the application data associated with the certified instance.

3. The method of claim 2, wherein the application data comprises an application package name and certificate in the application package.

4. The method of claim 2, further comprising:
    performing an alignment process to generate application data for the applications identified as the same application; and
    comparing the application data for the applications to determine certified applications and uncertified applications.

5. The method of claim 1, further comprising:
    detecting when an application identified as the same application is not available in a respective application marketplace; and
    marking the detected application as uncertified.

6. The method of claim 1, wherein comparing comprises:
    converting application data for the applications identified as the same application into a pre-defined format; and
    performing the comparing using the converted application data to determine the certified instances of the same application and the uncertified instances of the same application.

7. The method of claim 1, further comprising aggregating application data from multiple certified instances of the same application from the different application marketplaces into a single aggregated instance, wherein the single aggregated instance is returned as the search result.

8. The method of claim 7, further comprising maintaining instance specific information for the single aggregated instance, wherein the instance specific information identifies the certified instances of the same application from the different application marketplaces.

9. The method of claim 1, further comprising:
    determining a security rating for the certified instances of the same application; and
    providing the security rating for the certified instances of the same application in the search result.

10. The method of claim 1, further comprising:
    storing, by the computer system, information for the uncertified instances of the same application that are found in the different application marketplaces in the database;
    indexing, by the computer system, the information for the uncertified instances of the same application in the database; and
    storing, by the computer system, with the index, information based on the indexing for the uncertified instances of the same application, wherein the index is used to provide a search result for a search query for an application that includes both certified and uncertified instances of the same application.

11. The method of claim 1, wherein information indicating the uncertified instances of the same application in the search result are uncertified is provided in the search result.

12. The method of claim 1, wherein the search is performed with respect to the certified instances of the same application and not the uncertified instances of the same application.

13. The method of claim 1, further comprising providing information to the different application marketplaces identifying which instances of the same application are certified and uncertified.

14. A non-transitory computer-readable storage medium containing instructions, that when executed, control a computer system to be configured for:
   searching a plurality of application marketplaces for applications, wherein each application marketplace includes a plurality of applications available for download to a mobile device;
   analyzing information from the plurality of application marketplaces to determine which applications are identified as a same application in different application marketplaces;
   identifying a plurality of instances of the same application in the different application marketplaces;
   comparing the plurality of instances of the same application in the different application marketplaces to determine certified instances of the same application and uncertified instances of the same application;
   storing information for the certified instances of the same application that are found in the different application marketplaces in a database;
   indexing the information for the certified instances of the same application in the database; and
   storing an index based on the indexing, wherein the index is used to provide a search result for a search query for the same application, wherein the search result includes at least a portion of the certified instances of the same application, and does not include the uncertified instances of the same application or includes information indicating the uncertified instances of the same application are uncertified.

15. The non-transitory computer-readable storage medium of claim 14, wherein comparing the plurality of instances of the same application in the different application marketplaces to determine certified instances of the same application and uncertified instances of the same application comprises:
   determining a certified instance of the same application;
   determining application data associated with the certified instance of the same application; and
   determining if a second instance of the same application is not certified based on comparing application data associated with the second instance and the same application data associated with the certified instance.

16. The non-transitory computer-readable storage medium of claim 14, further comprising:
   storing information for the uncertified instances of the same application that are found in different application marketplaces in the database;
   indexing the information for the uncertified instances of the same application in the database; and
   storing with the index, information based on the indexing for the uncertified instances of the same application, wherein the index is used to provide a search result for a search query for an application that includes both certified and uncertified instances of the same application.

17. The non-transitory computer-readable storage medium of claim 14, wherein information indicating the uncertified instances of the same application in the search result are uncertified is provided in the search result.

18. The non-transitory computer-readable storage medium of claim 14, wherein the search is performed with respect to the certified instances of the same application and not the uncertified instances of the same application.

19. The non-transitory computer-readable storage medium of claim 14, further configured for providing information to the different application marketplaces identifying which instances of the same application are certified and uncertified.

20. A method comprising:
   searching, by a computer system, a plurality of application marketplaces, wherein each application marketplace includes a plurality of applications available for download to a mobile device;
   analyzing, by the computer system, information from the plurality of application marketplaces to determine which applications are identified as a same application in different application marketplaces;
   identifying, by the computer system, a plurality of instances of the same application in different application marketplaces;
   comparing, by the computer system, the plurality of instances of the same application in the different application marketplaces as to determine certified instances of the same application and uncertified instances of the same application;
   indexing, by the computer system, the certified instances of the same application that are found in different application marketplaces;
   receiving a search query for an application;
   searching, by the computer system, an index based on the indexing to determine certified instances of the same application that are associated with the search query; and
   returning, by the computer system, a search result for search query that includes at least a portion of the determined certified instances, wherein the search result does not include the uncertified instances of the same application or includes information indicating the uncertified instances of the same application are uncertified.

* * * * *